(12) United States Patent
Brabban et al.

(10) Patent No.: US 9,125,016 B2
(45) Date of Patent: Sep. 1, 2015

(54) TRACKING OF PHYSICAL LOCATIONS (75) Inventors: Paul Brabban, London (GB); Christopher P. Pledger, London (GB)

(73) Assignee: HSBC GROUP MANAGEMENT SERVICES LIMITED, London (GB)

( * ) Notice: Subject to any disclaimer, the term of this patent is extended or adjusted under 35 U.S.C. 154(b) by 4 days.

(21) Appl. No.: 14/002,635

(22) PCT Filed: Mar. 5, 2012

(86) PCT No.: PCT/GB2012/050485
§ 371 (c)(1),
(2), (4) Date: Nov. 8, 2013

(87) PCT Pub. No.: WO2012/120289
PCT Pub. Date: Sep. 13, 2012

(65) Prior Publication Data
US 2014/0051463 A1    Feb. 20, 2014

(30) Foreign Application Priority Data
Mar. 4, 2011    (GB) .................................. 1103734.8

(51) Int. Cl.
*H04W 24/00* (2009.01)
*H04W 4/02* (2009.01)
*H04L 12/24* (2006.01)
*H04L 29/08* (2006.01)
*H04L 29/12* (2006.01)

(52) U.S. Cl.
CPC ................. *H04W 4/02* (2013.01); *H04L 41/12* (2013.01); *H04L 41/5058* (2013.01); *H04L 61/609* (2013.01); *H04L 67/1021* (2013.01); *H04L 67/16* (2013.01); *H04L 67/18* (2013.01); *H04L 61/1511* (2013.01)

(58) Field of Classification Search
CPC ....... H04W 4/02; H04W 64/00; H04W 4/023; H04W 4/025; H04W 4/021; H04W 64/003; H04W 48/04; H04W 28/0226; H04W 60/04; H04W 88/02
USPC ...................................................... 455/456.2
See application file for complete search history.

(56) References Cited

U.S. PATENT DOCUMENTS

2007/0226294 A1* 9/2007 Pruitt et al. .................... 709/203
2009/0198834 A1* 8/2009 Crow et al. .................... 709/245
2010/0269109 A1* 10/2010 Cartales ............................ 718/1

* cited by examiner

*Primary Examiner* — Kwasi Karikari
(74) *Attorney, Agent, or Firm* — Stroock & Stroock & Lavan LLP (57) ABSTRACT

An apparatus and method for tracking physical locations from which a service is provided are disclosed. The apparatus comprises a communication module operable to send and receive messages, a location identifier and a query element operable to request the communication module to send a location request message for a service. The communication module is operable to receive a location response message responsive to said location request message, said location response message comprising location information for the service; and forward the location information of the service to the location identifier. The location identifier is operable to identify the physical location associated with the location information of the service.

19 Claims, 8 Drawing Sheets

S1 (primary)     DC1 → DC1 + 50% DC2 → 50% DC1 + 50% DC2
S1 (secondary)   DC2 → 50% DC2        → 50% DC1 + 50% DC2
                 $t_1$        $t_2$              $t_3$

| IP | Data Centre | (V)LAN |
|---|---|---|
| IP11 | DC1 | N1 |
| IP12 | DC2 | N1 |
| IP13 | DC1 | N1 |
| IP21 | DC2 | N2 |
| IP31 | DC3 | N3 |

FIG. 9a

| IP100 | M0 | N1 | DC1 |
|---|---|---|---|
| IP101 | M1 | N1 | DC2 |
| IP200 | M2 | N2 | DC2 |
| IP300 | M3 | N3 | DC3 |

S1
| | | | |
|---|---|---|---|
| $t_1$ | IP1 | DC1 | Svr10 |
| $t_2$ | IP2 | DC1 | Svr11 |
| $t_3$ | IP1 | DC1 | Svr10 |
| $t_4$ | IP1 | DC1 | Svr10 |
| $t_5$ | IP2 | DC1 | Svr11 |

| | | | |
|---|---|---|---|
| $t_1$ | IP1 | DC1 | Svr10 |
| $t_2$ | IP2 | DC1 | Svr11 |
| $t_3$ | IP1 | DC1 | Svr10 |
| $t_4$ | IP1 | DC1 | Svr10 |
| $t_5$ | IP1 | DC1 | Svr10 |

FIG. 11a

| | | | |
|---|---|---|---|
| $t_1$ | IP1 | DC1 | Svr10 |
| $t_2$ | IP3 | DC2 | Svr20 |
| $t_3$ | IP3 | DC2 | Svr20 |
| $t_4$ | IP4 | DC2 | Svr21 |
| $t_5$ | IP3 | DC2 | Svr20 |

TRACKING OF PHYSICAL LOCATIONS

This application is a national phase application under §371 of, and claims priority to PCT/GB2012/050485, filed Mar. 5, 2012, which in turn claims priority to United Kingdom Patent Application No. 1103734.8, filed Mar. 4, 2011, the entire contents of both applications are expressly incorporated herein by reference.

FIELD

The present invention related to apparatus and method for monitoring and tracking services and in particular to track and/or monitor locations from which services are provided.

BACKGROUND

Large scale computer systems may be used to provide a number of different services. A service may be any software, hardware or software and hardware implemented function provided at one or more computers for consumption at another computer. Examples of services may include, but are not limited to, web page services, email services, database access services, secure portal services, authentication services, search services and network monitoring services. Any given service may be provided in such a way that a number of individual server computers simultaneously provide the service under a load balanced or other workload distribution arrangement, for example a cluster. Any given service may also be provided in such a way that a number of individual servers are configured for active provision of the service and a further number of individual servers are configured for fall-back (also known as contingency) provision of the service. The fall-back provision may be invoked, for example as part of a testing or proving process, if one or more of the active provision servers cease operation and/or if a demand for the service exceeds a threshold or a current service provision capacity of the active provision servers. Similarly, one or more active provision servers may be reassigned to fall-back provision if a demand for the service is smaller than a threshold or than a current service provision capacity of the active provision servers or if one of the active provision servers starts operation again. Additionally, at any time, a different combination of all available servers may be allocated to either the active or fall-back provision for any given service. Any such changes in the servers allocated to a service and any such changes in the active and fall-back status of servers for a service may be carried out manually by an operator or automatically by a computer management system. Thus it can be seen that between any two points in time, the individual servers providing a given service may change significantly.

This low-level, high-volume detail is often unnecessary to determine the business-level configuration of a service. In addition, the technical nature of the information is often inappropriate for business areas involved in service management activities. Business continuity needs drive physical infrastructure to be distributed across discrete physical locations, meaning that the information driving service management is not which infrastructural component or components is providing the service, but physically where those components are located. The roles of those locations may differ from service to service and change over time, preventing the role of an individual physical component from being inferred directly.

The present invention has been conceived in the light of drawbacks and limitations of conventional systems.

SUMMARY

The present invention can provide an apparatus, a method, a system and a computer program which enable tracking and/or monitoring of the physical locations from which services are being provided. Thus changes in service provision physical locations over time can be monitored and/or tracked and any appropriate corrective, mitigating or other management action associated with changes in service provision physical locations can be implemented based on useful monitoring and/or tracking results.

The granularity of locations can be set according to the requirements of the services being provided and/or to the environment. Thus the locations can be continents, countries, states/regions/counties, cities, postcodes, streets, campuses, data centres, buildings, rooms, server racks or cabinets, individual servers, a processor core and/or a combination of any of these.

In one embodiment of the invention, there is provided an apparatus configured to track physical locations from which a service is provided, the apparatus comprising a communication module operable to send and receive messages, a location identifier, a query element, and a history module. The query element is operable to request the communication module to send a location request message for a service; to receive from the communication module a location response message responsive to said location request message, said location response message comprising location information for the service; and to forward the location information of the service to the location identifier. The location identifier is operable to identify the physical location associated with the location information of the service and to forward data describing the physical location to the history module. The history module is operable to create a tracking record of physical locations for the service The history module may include a database for the tracking record of physical location information, may use an external database, or may use an internal database and use an external database for the tracking record. This tracking record provides information regarding the evolution of the physical locations from which a service is provided which are not immediately available. The statistics, built from part or the whole of the tracking record, process the information regarding the physical locations from which the service is provided in order to provide a different level of information, for example, an average distribution of the service across the physical locations or the main physical location of the service.

The tracking statistics may be built from data relating to subsequent periods of time or relating to rolling periods of time and may be built automatically, on request or a combination thereof.

The communication module may be operable to send and receive IP messages, if the apparatus is connected to an IP network for example. The location request may include one or more DNS request and/or at least part of an SNMP message.

The location identifier may use at least one database to identify the physical location associated with the location information and said location information may be an IP address.

The apparatus of the invention may be implemented as a single physical and/or logical element or may be a combination of several physical and/or logical elements distributed at different physical and/or logical locations, for example, various servers being part of a clustered environment.

Likewise, the tracked service may be provided by one physical element, a plurality of physical elements and/or be part of a clustered environment.

In another embodiment of the invention, a method for tracking physical locations from which a service is provided, the method comprising the steps of sending a location request message for a selected service; receiving a location response message responsive to said location request message, said location response message comprising location information for the selected service; identifying the physical location associated with the location information; and creating a tracking record of physical locations associated with the location information of the selected service.

The method may further comprise the steps of building tracking statistics of physical location information of the selected service over two or more periods of time.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the scope of the invention as defined by the appended claims.

DETAILED DESCRIPTION

In a service provision environment, a plurality of services may be provided from a number of physical computing resources. For example, one data centre may provide ten different services. In another example, five data centres may provide two services. In another example, a single service may be provided by three data centres. Thus it will be understood that there may not be, and indeed in some cases will not be, a direct relation between the number of physical computing resource units and the number of services provided. The provision of multiple services by multiple physical computing resource units will be illustrated with reference to FIGS. 1 to 4.

Figure 1A:
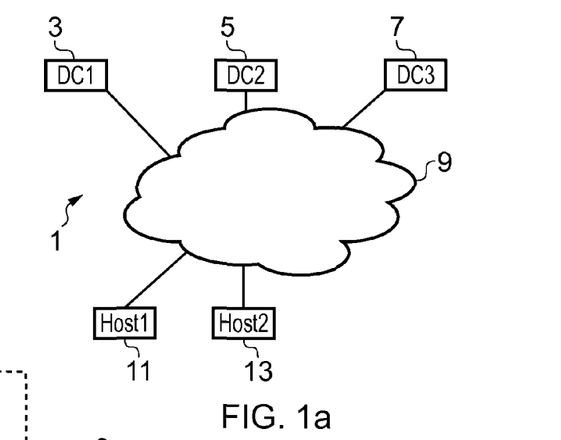
FIG. 1a is a schematic representation of physical elements in a service provision environment.

FIG. 1a shows a schematic representation of physical computing resource elements in a service provision environment. As shown, the service provision environment 1 includes three data centres DC1, DC2 and DC3 referenced as elements 3, 5 and 7 respectively. Each of the data centres 3, 5 and 7 are connected to a communications network 9. In the present example the communications network 9 is the Internet. In other examples, the communications network 9 may be an alternative private or public network such as a LAN, WAN or any combination thereof. Also, the communications network 9 may comprise more than one network. For example, the data centres may connect via a WAN which itself is connected to the Internet. Each of data centres 3, 5 and 7 may have its own or shared security arrangements to prevent unauthorised access to, damage to or modification of the data centre from the communications network 9. Such security arrangements may include known security elements such as firewall, intrusion detector/blocker, traffic filter etc. The communications network 9 of the present examples includes some form of network management and routing (not shown). In the case of a TCP/IP network such as the internet, this will usually include domain name system (DNS) capable equipment to translate between DNS names and IP addresses.

Also connected to the communications network 9 shown in FIG. 1a are two host systems Host1 and Host2, referenced as elements 11 and 13 respectively. The host systems are computer systems which host one or more clients subscribing to, accessing or receiving services. Any number of host systems may be connected to the communications network 9. Each host system may be a computer system associated with a client and user where the user, the client or both may be the beneficiary of a provided service. Also, a host system may host a service provider as well as a service client. Thus each individual host system 11, 13 may be a single workstation or terminal associated with a user or may be a workgroup, a database, a building, a computer server, a virtual host, or any other recipient of a provided computing service.

As will be appreciated, communications via the communications network require an address system to enable different entities to route communications between one another. In the present example the communications network 9 uses numerical addressing, such as the well known IP address systems used by networks employing TCP/IP for network communications control. Thus each data centre and each host have addresses which allow them to communicate with each other, for example for providing a service.

Figure 1B:
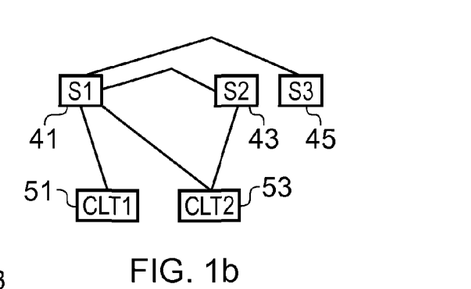
FIG. 1b is a schematic representation of logical elements in a service provision environment and of the service interactions between these logical elements.

FIG. 1b show so example of service interaction between three services S1, S2 and S3, referenced as elements 41, 43 and 45 respectively, and two clients CLT1 and CLT2, referenced as elements 51 and 53 respectively. In this example, client CLT1 interacts with service S1, client CLT2 with services S1 and S2 and service S3 with services S1 and S2. S1, S2 and S3 may for example be an email service, a web service and a LDAP service respectively. Any combination of client and service interactions may be considered in the service provision environment.

Figure 2A:
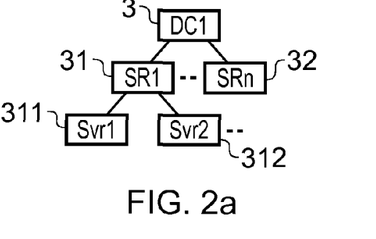
FIGS. 2a and 2b are schematic hierarchical representations of a data centre.
Figure 2B:
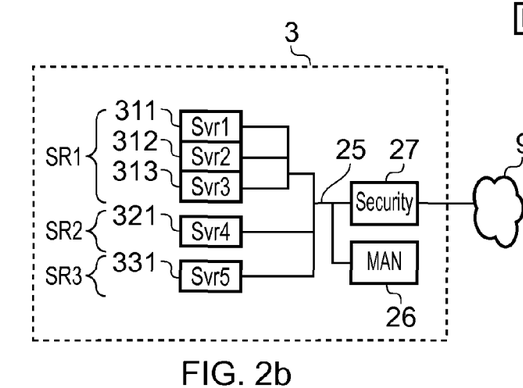

FIGS. 2a and 2b illustrate schematically a possible constitution of DC1, the data centre referred as element 3. As shown in FIG. 2a, a data centre may include a number of servers racks SR1 . . . SRn, referenced as elements 31, 32 respectively. The server racks 31, 32 may each contain a number of servers Svr1, Svr2, . . . referenced as elements 311, 312 respectively. As shown on FIG. 2b, the server racks SR1, SR2 and SR3 are interconnected via a networking arrangement 25 such as a LAN. The data centre also includes a management function 26 which may provide management functions such as server monitoring and OOB control, software and data updates and alterations, load balancing and other management tasks. Additionally, the data centre of the present examples includes an optional security element 27. The security element 27 may include known security elements such as firewall, intrusion detector/blocker, traffic filter etc.

Within the server racks SR1-SR3, the data centre may include a large number of individual server computers. These may be conventional rack-mount server computers based upon any physical server hardware and operating any suitable operating system. It is common for data centres to be operated having a minimum number of different hardware and operating system configurations to simply management considerations, but in practice any number of combinations of hardware and operating systems may be employed.

Within each data centre, each individual network interface of any computer equipment which is capable of communicating with another and connected via the network 25 has an address which is usually unique within at least its LAN. Traffic arriving at the LAN may be directed to one or more advertised or published addresses. In the present example, each service provided by the data centre may have one or more external addresses associated therewith. If a network node provides a network address translation (NAT) function at the border of a LAN it will then forward the incoming traffic directed to the advertised external address to the appropriate network interface within the LAN. In environments where one or more load balancer is provided, the traffic might be redirected to the load balancer associated with the specified service and this load balancer will allocate each traffic item to a particular server or server cluster.

Running on individual servers in the server racks of each data centre is software, firmware or any other type of computer-implemented program that provides one or more services. In the present examples, such services may include, for example, database access engine, database query engines, security authentication services, file storage services, file search services, data monitoring services, data replication services, backup services or any other computer provided service. Multiple ones of individual servers may be configured to provide the same service under a clustered or load balanced arrangement. Also, individual servers may be configured provide more than one service.

Thus it will be understood that a service provision environment may be made up of a number of physical computing resource units. Depending upon the desired granularity or view, a physical computing resource unit may be considered as being a data centre, a computer room, a server rack, a server, a physical processor core, or any other physically discrete computing resource element. The physical computing resource units can be distributed over a number of physical locations and are interconnected for data communications therebetween.

Figure 3A:
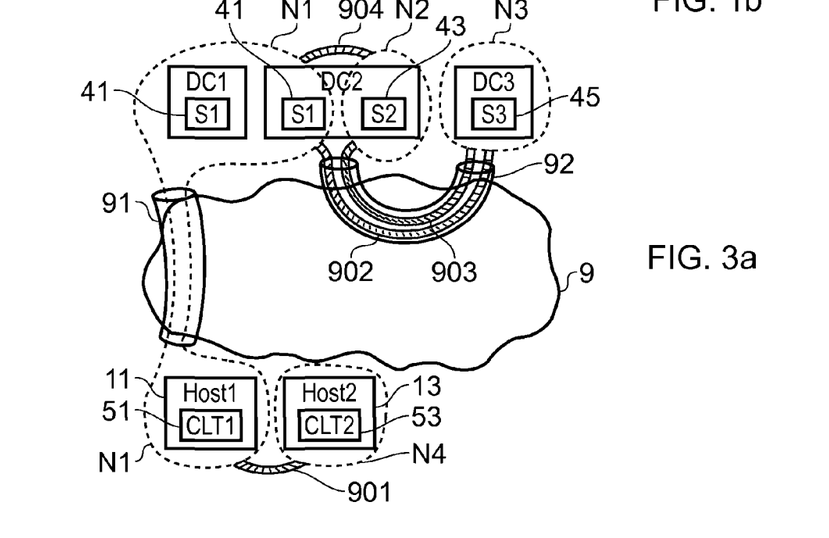
FIGS. 3a and 3b are schematic representations of logical elements in a service provision environment wherein the logical and physical arrangements of the environment have been mapped.
Figure 3B:
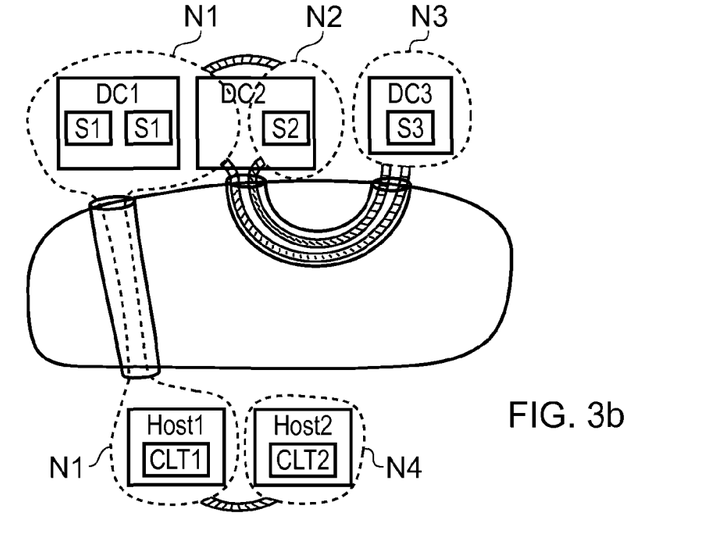

Considering now FIGS. 3a and 3b, these figures schematically illustrate an example of logical elements in a service provision environment and of a possible mapping of the logical elements with a physical environment. Here it can be seen that three services S1, S2 and S3 are logically connected so as to be available to the relevant services' users via the communications network in accordance with the particular environment of FIG. 1b. Therefore the client CLT1 has access to S1, client CLT2 to S1-S2 and service S3 to S1-S2. In the example of FIGS. 3a and 3b, S1 is running in a first LAN or VLAN N1, S2 is running in (v)LAN N2 and S3 is running in (v)LAN N3. The (v)LANs are interconnected via links 901, 902, 903 and 904. These links may be provided for example by configuring traffic routing rules in each (v)LAN. Tunnels, e.g. VPNs, may be provided to interconnect various elements or (v)LANs and they may provide long distance connections between and/or within the (v)LANs. In the example of FIG. 3, tunnels 91 and 92 are provided to allow interconnection of various physical locations across the Internet, for example tunnel 92 is used by links 902 and 903.

Any appropriate logical and physical configurations and mappings between them may be used in the service provision environment. For example and as can be seen in FIGS. 3a and 3b, there isn't any mandatory correlation between the (v)LANs and the physical environment, for example the data centres. In these figures, N1 extends over more than one data centre (DC1 and DC2), N2 over less than one (DC2) and N3 over exactly one (DC3). Likewise, there isn't any mandatory correlation between the Hosts and clients and their network configuration. Other environments (not represented) wherein different instances of a service may be operating in different (v)LANs and wherein said instances may change (v)LAN when changing servers are also suitable environments for implementation of the approaches taught in the present disclosure.

Figure 4A:
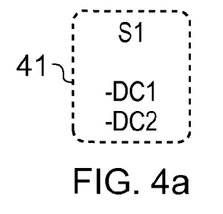
FIGS. 4a to 4c are schematic representations of a mapping between logical service provision and physical data centres.
Figure 4B:
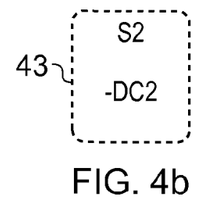
Figure 4C:
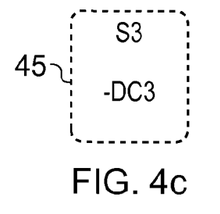

An example of the mapping of the services 41, 43, 45 to the physical computing resource units is provided. In FIGS. 4a, 4b and 4c. In this example, the mapping shows the provision of the services by reference to the different data centres. As illustrated in FIG. 4, service S1 is provided by data centres DC1 and DC2, service S2 is provided by data centre DC2 only and service S3 is provided by data centre DC3 only. Thus, in the present example, DC1 provides service S1, DC2 provides S1-S2 and DC3 provides S3. The mapping illustrated in FIG. 4 corresponds for example to the environment represented in FIG. 3a.

Thus it can be seen that a number of logical services may be provided from a range of physical computing resource units. It will therefore be understood that by requesting or accessing a service, a client may be directed to or serviced from one or more of a number of different physical computing resource units.

This physical distribution of physical resources providing a given service may be further exaggerated by load balancing between different physical computing resource units tasked with providing a given service and by changes in allocations of physical computing resource units as primary (i.e. active) and secondary (i.e. standby or fall-back) providers of a given service. For example, service provision management elements (which may include a human operator and/or an automated management process) can be configured to monitor the loading on physical computing resource units and to alter the allocations of individual ones of the physical computing resource units to the provision of different services and to alter the allocations of individual ones of the physical computing resource units to primary or secondary providers of any given service.

The service provision management elements may be co-located with the data centre management function 26 and monitor the loading and behaviour of all servers within a respective data centre and communicate with data centre management functions of other data centres to balance loading across all relevant data centres. In other examples, the service provision management elements may be provided as a dedicated separate service from one or more data centres. In another example a dedicated hardware facility may be provided for the service provision management elements. In a further example, the service provision management elements are provided as a management function within the communications network 9.

Figure 5:
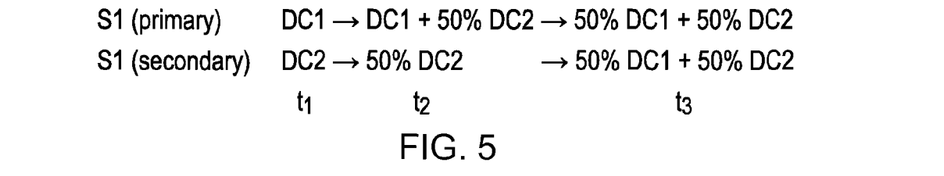
FIG. 5 is a schematic representation of a change of physical computing resource units providing a service over time.

An example of server reallocation over time will now be discussed with reference to FIG. 5. Using the examples of FIG. 4 discussed above as a starting point, service S1 is allocated to be provided by DC1 and DC2. This illustration commences at a first point in time $t_1$. At this time, all of the physical resources of DC1 that are allocated to S1 are set as primary and all of the physical resources of DC2 that are allocated to S1 are set as secondary (fall-back). Over time, the volume of requests for S1 from clients increases, such that at a second point in time $t_2$, the allocation of primary and secondary units is altered such that all of the physical resources of DC1 that are allocated to S1 remain set as primary and that 50% of the physical resources of DC2 that are allocated to S1 are set as primary with the remaining 50% of physical resources of DC2 that are allocated to S1 remaining set as secondary. Thus the number of physical resources actively providing S1 has been increased out of the secondary allocation in order to meet client demand.

At a later point in time $t_3$ the client loading for S1 has reduced, but the client loading for S4, another service has increased (not represented). The loading for S4 does not directly affect S1, but S1 and S4 are both provided by DC1. Thus, in order to increase the available resource at DC1 to satisfy the demand for S4, the allocation of physical resources to S1 is altered other than by simply reverting to the allocation scheme at time $t_1$. Rather, at $t_3$, 50% of the serves at DC1 that are allocated to S1 are moved to standby with the other 50% remaining active. The allocations at DC2 are not altered at this time. Thus the number of active physical resources for S1 has been reduced to follow the reduced demand for S1 at time $t_3$, but the allocation of physical physical resources to provide S1 has changed relative to the position at $t_1$. At $t_3$, none of the physical resources of DC1 that are allocated to S1 have yet been reallocated to S4 but by placing some of the S1 physical resources of DC1 into standby, the facility is provided to reallocate some of the S1 physical resources of DC2 to be S4 physical resources is necessary.

It will be understood that such reallocations of physical resources between primary/standby states and reallocation of physical resources to different services can be conducted on a real-time ongoing basis and that allocations will change dynamically over time.

Thereabove have been described a number of examples of a service provision environment in which a service provision location moves about within the environment over time.

With reference to FIGS. 6 to 16, a number of examples of arrangements for monitoring and/or tracking service provision locations will be described.

In the present examples, a monitoring function is provided to obtain information relating to the present service provision location of a given service or services and optionally to log or track the obtained present service provision location information for one or more services in order to produce a service provision location history. Optionally, the monitoring function may enable access to the present service provision location and/or service provision location history either directly via a user interface or indirectly by outputting the information in a form readable by a third party system.

Figure 6:
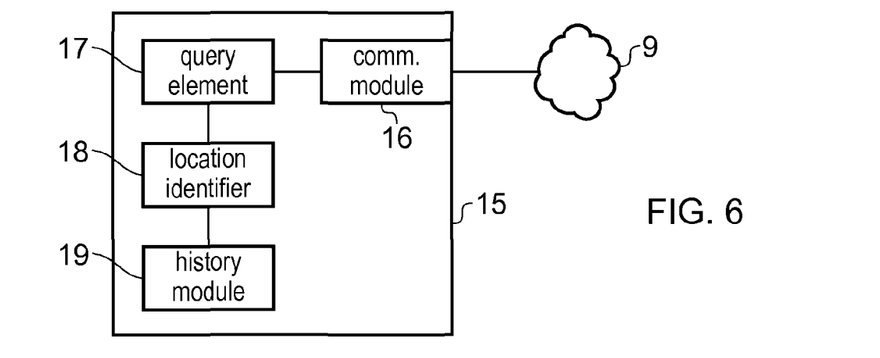
FIG. 6 is a schematic representation of a monitor system.

FIG. 6 shows schematically a monitor 15 which includes a number of elements which operate together to provide the functionality of the monitor 15. These elements include a communication module 16, a query element 17, a location identifier 18 and a history module 19. The monitor 15 may be connected to the communications network 9 via the communication module 16. The monitor 15 may also be provided with some form of security function (not represented) which may be part of the communication module 16 or may be provided as a separate element of or external to monitor 15. The security function may include known security elements such as firewall, intrusion detector/blocker, traffic filter etc.

The monitor 15 of the present examples includes a query element 17 configured to obtain present service provision location information for one or more services, a location identifier 18 configured to track the obtained present service provision location information for one or more services in order to produce a service provision location history, and a history module 19 for creating a tracking record of the service provision location. By this arrangement, a service provision location history can be established and made accessible.

The elements of the monitor 15 may be provided as a unitary computer system with ell of the functionality of the different elements or a plurality of unitary computer system may provide part of, one, or more of the functionality of the different elements.

Figures 7A, 7B:
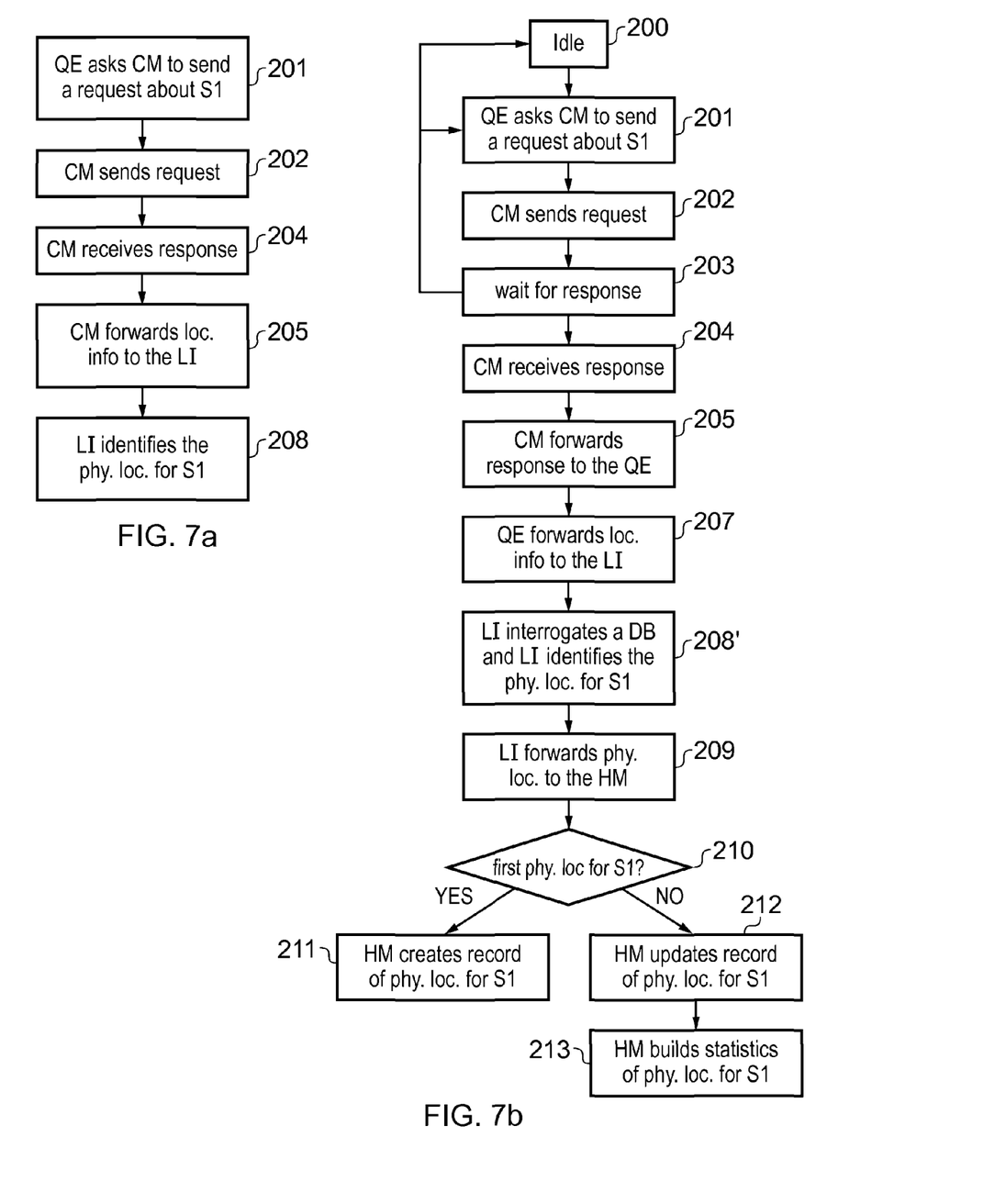
FIGS. 7a and 7b are flowcharts illustrating a status enquiry process.

FIGS. 7*a* and 7*b* illustrate different combination of steps which can be carried out by the monitor and/or other elements of the service provision environment. In the example shown in FIG. 7*a*, at the first step 201 the query element 17 requests the communication module 16 to send a location request message regarding the service S1. The location request message may also be in respect of other services. The communication module then sends the request at step 202 and receives the location response at step 204. The location response comprises location information for S1, which the communication module forwards to the location identifier at step 205. Finally, at step 208, the location identifier identifies the physical location associated with the location information for S1 returned in the response. The physical location may for example be a server, a data centre or a cabinet and postcode or a country. In this example, the location information is forwarded directly from the communication module to the location identifier and may be forwarded in any suitable way. For example the entire received location response may be forwarded without any modification or the location information only may be forwarded.

Thus, there has been described a system configured to track physical locations from which a service is provided by making a request for the service and noting a location from which the service is provided in the response to the request.

The example illustrated in FIG. 7*b* shows a similar method in more detail, including a number of additional optional steps. First, the monitor 15 is idle (step 200), then the query element 17 requests the communication module 16 to send a location request about S1 at step 201. This step may be triggered automatically, for example periodically, or manually, for example when requested by a user or another entity. The communication management then sends the location request at step 202 and waits for the response (step 203).

Mechanisms may be available to avoid waiting for too long so that the monitor 15 goes back to idle mode (step 200) or sends another request (step 201), regarding S1 or any other service. Such mechanisms may include a timeout or delay counter or a fixed interval trigger to automatically trigger a new request when operating under an automatic request interval control. At step 204, the communication module receives a location response which comprises location information for S1 and then forwards the response to the query element (step 206). Subsequently, the query element forwards the location information regarding S1 to the location identifier at step 207. At the next step, step 208', the location identifier then interrogates a database in order to identify the physical location associated with the location information returned in the location response. This physical location for S1 is then forwarded to the history module 19 at step 209. The next steps depend on whether the history module already has a tracking record for S1 (210). If the history module does not have any tracking record for S1, it creates one at step 211 with the physical location of S1 identified at step 208'. Else, the history module updates the existing tracking record at step 212 and may then build statistics of physical locations for S1 at step 213. The statistic building may be performed automatically, for example, after each step 212 or periodically, or may performed when triggered by a user or another entity.

Thus there has been described a system configured to track physical locations from which a service is provided and to create a tracking record of said physical locations wherein said tracking record may be used to build statistics of physical locations over a certain number of periods of time.

Figure 8A:
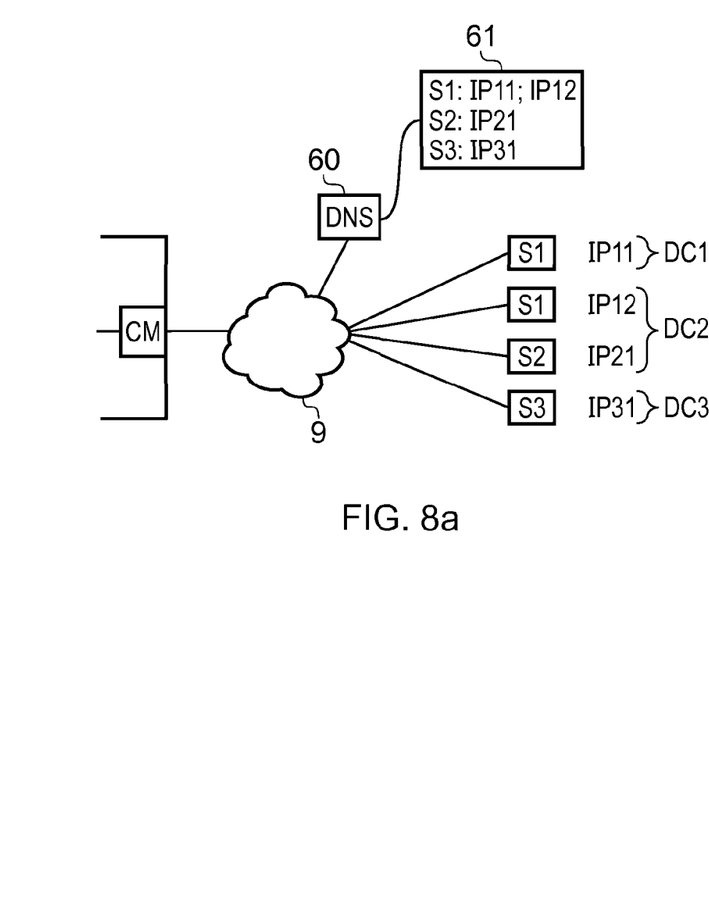
FIGS. 8a and 8b are examples of monitorable service provision situations.
Figure 8B:
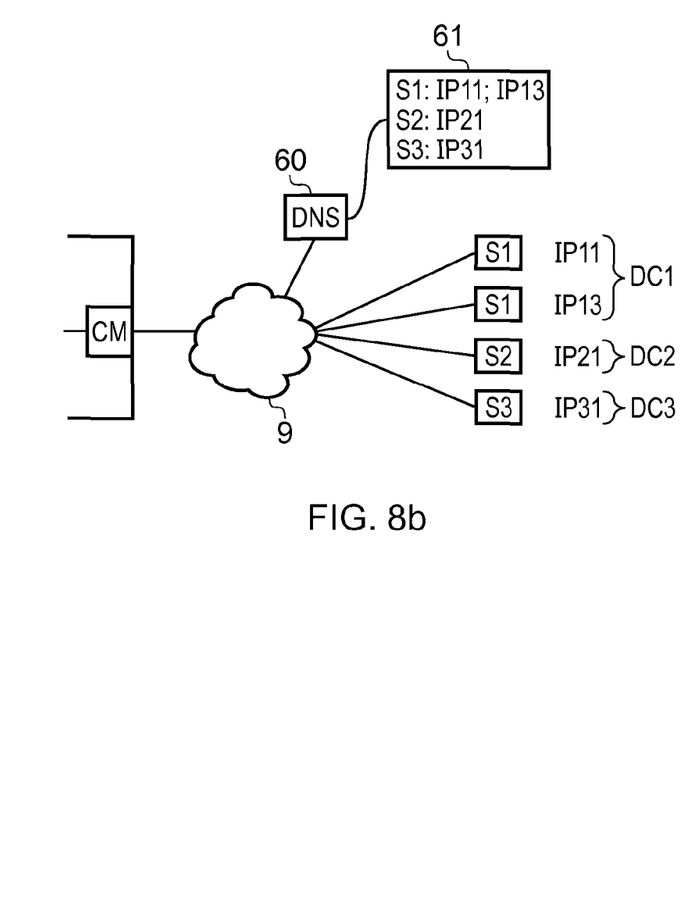

FIGS. 8a and 8b illustrates examples in which the services to be tracked are hosted by servers in an IP network and the monitor 15 is also connected to an IP network, in order to track the physical locations of the services, the monitor 15 uses DNS requests and responses in order to retrieve the IP address of the servers hosting the services. In the example of FIG. 8, three services S1, S2 and S3 are tracked, wherein two instances of S1 are running. At a first point in time, represented by FIG. 8a, one instance of S1 runs in data centre DC1, the second instance of S1 runs in DC2, S2 runs in DC2 and S3 runs in DC3. At a second point in time, represented by FIG. 8b, the second instance of S1 has moved from DC2 to DC1. The monitor 15 has access to a DNS server 60 which maintains a table 61 of relationship between a DNS name and an IP address. At the first point in time, the service S1 which can be addressed using a DNS name, for example "email.company.com", is associated with two IP addresses IP11 and IP12, whilst the DNS name for S2 and S3 are associated with IP21 and IP31 respectively. At the second point in time, the second instance of S1 moved to DC1 and the DNS table 61 has been updated accordingly. If the monitor 15 sends a location request regarding S2, it will then receive IP21 in the location response. If the monitor 15 sends a location regarding S1, it will receive either IP11, IP12 or both in the response at the first point in time, and either IP11, IP13 or both in the response at the second point in time.

Thus there has been described a system configured to monitor the physical locations from which a service is provided wherein the monitoring of said physical locations may use any existing protocols and/or systems already available in the environment, such as the known DNS system.

Figure 9A:
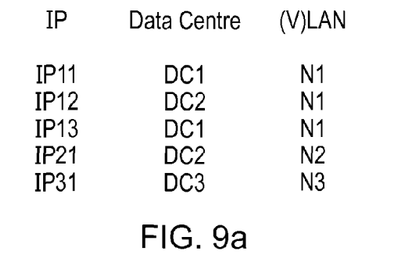
FIGS. 9a-9b are examples of tables associating location information and physical information.
Figure 9B:
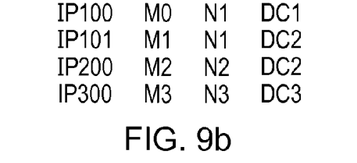
Figure 9C:
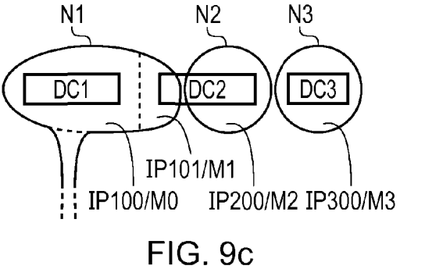
FIG. 9c is an example of mapping of local networks to the physical environment according to the table in FIG. 9b.

Example databases that may be used by the location identifier to identify the physical location associated with the location information for a service are illustrated in FIGS. 9a and 9b. FIG. 9a shows a database where each IP address is associated with the corresponding LAN or vLAN and data centre. FIG. 9b shows a database wherein the mapping of IP addresses with the (v)LAN and with the data centres is maintained using sub-networks represented with the notation IP-address/mask. Such a sub-network may for example be 192.168.0.0/24 which contains all IP addresses from 192.168.0.0 to 192.168.0.255. FIG. 9c provides a schematic representation of a configuration that would lead to the database in FIG. 9b. A database may contain any location information that is required and/or available. For example, some IP addresses may be also associated with a cabinet or a server in the database.

In order to maintain the mapping between location information, for example an IP address, and physical location, for example a server and/or a data centre, any suitable means may be used.

A tracking record maintained by the monitor 15 may keep track of more information than just the physical location from which the service is provided. For example, it may contain several levels of physical location data, such as some combination of one or more of location data, including country, region, city, data centre, server rack and server.

Various examples of tracked data and possible representations thereof are now discussed with reference to FIGS. 10-13.

Figure 10A:
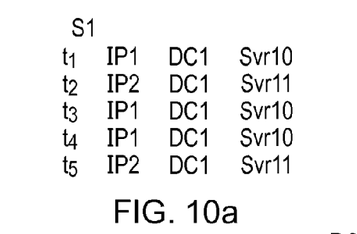
FIGS. 10a, 11a and 12a show examples of extracts of a record of physical location.

FIG. 10a shows an example of a tracking record which, for each location response received, contains a line with a timestamp, an IP address, a data centre and a server.

Figure 10B:
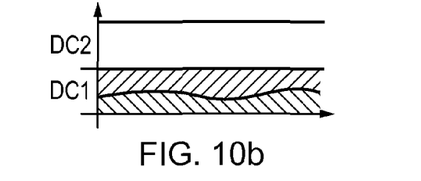
FIGS. 10b, 11b and 12b show examples of graphical representation of statistics.

In the example of FIG. 10a, the service S1 is provided equally by two servers Svr10 and Svr11 in the data centre DC1 at the same time. Therefore the extract from the tracking record shown in FIG. 10a shows that the physical locations from which the service is provided alternate between Svr10 and Svr11 in DC1. An example of statistics built using this tracking record and of a possible representation of said statistics is shown in FIG. 10b. The diagram of FIG. 10b shows a rolling average distribution of the physical location from which S1 is provided across various servers in DC1 and DC2. The diagram also shows that all of S1's servers are running in DC1 and that the S1 is distributed equally between Svr10 and Svr11.

Figure 11A:
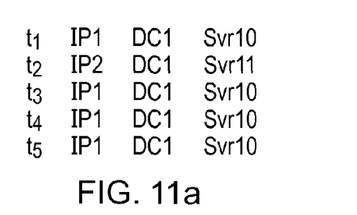
Figure 11B:
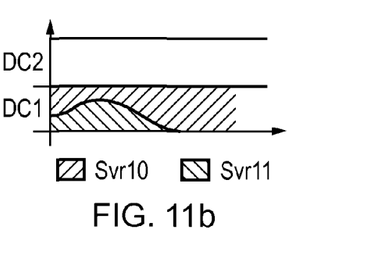

FIGS. 11a and 11b also show an extract from a tracking record and of the corresponding graphical representation of the rolling average distribution of S1, but in a second situation. In the situation of FIG. 11, after t2, Svr11 is no longer identified as a physical location from which S1 is provided and, accordingly, the graphical representation shows that after a certain point in time, S1 is only provided by Svr10. Because FIG. 11b represents a rolling average distribution of the service, the share for Svr11 decreases slowly even if Svr11 suddenly stops working. An administrator using the monitor 15 could then identify that there may be a problem with Svr11 and may further identify that having the service running on only one server involves a risk. An automatic or human administrator would then be able to take further investigative and/or corrective action with respect to one or both of the availability of Svr11 and the non-distribution of S1.

Figure 12A:
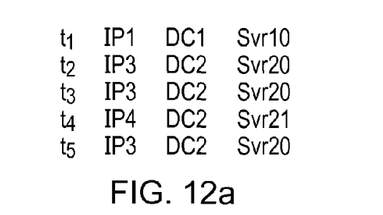
Figure 12B:
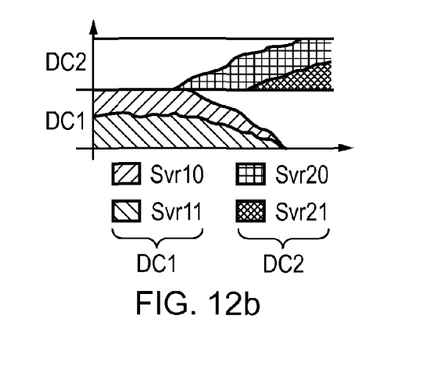

FIGS. 12a and 12b also show an extract from a tracking record and of the corresponding graphical representation of the rolling average distribution of S1, but in a third situation. In this situation, S1's servers change from servers in DC1 to servers in DC2. S1 is still provided by two different servers, but those servers are now Svr20 and Svr21 in DC2. The graphical representation immediately shows the change from DC1 to DC2. An administrator using the monitor 15 could therefore immediately identify that there may be a problem in the data centre DC1 which caused S1 to move from DC1 to DC2. An automatic or human administrator would then be able to take further investigative and/or corrective action with respect to the availability of DC1.

The tracking record of physical locations from which a service is provided may also include further information, for example the physical location information from the location response, or any other relevant information. Said further information may be for example used to build statistics, to check the accuracy of the record's content or simply to increase the amount of information available. In the record extracts shown in FIGS. 10a, 11a and 12a, the IP address for the service is included along with the server corresponding to the IP address and the data centre where the server is located.

Figure 13:
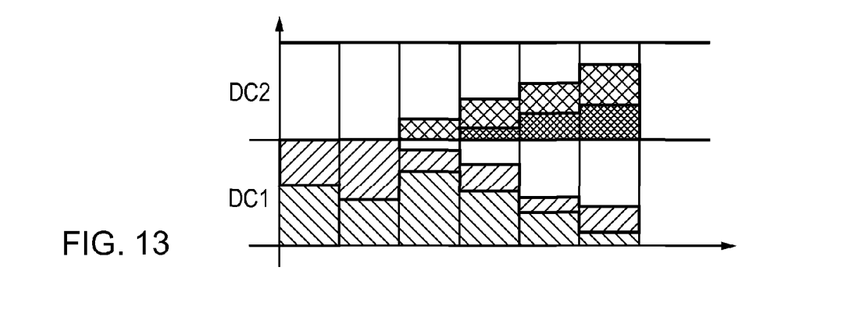
FIGS. 13 and 14a-14c show examples of graphical representation of statistics.

FIG. 13 shows an example graphical representation of the statistics from FIG. 12a where they are built with data over subsequent periods of time. The graphical representation therefore shows steps rather a smooth curve like in FIG. 10b, 11b, 12b where the statistics are built with data relating to a rolling period of time.

The statistics built by the history module enable a further level of understanding of the service provision environment. For example, when sending a DNS request in respect of a service, the response is likely to only contain one IP address and as the result, the location identifier may only identify one of a number of physical locations from which the service is provided. For example, in the service provision environment of FIG. 8a, a response to a DNS request for service S1 may contain either IP11 or IP12, but is unlikely to contain both. Therefore, whilst a unique location response in respect of a service may be accurate, it may not enable a monitor's administrator and/or user to fully understand from which physical locations a service is provided. The statistics built by the history provide an even more comprehensive analysis of the physical locations from which the service is provided and further enhance the outcome of the use of technical means, such as DNS means, in order to give the monitor's administrator and/or user an accurate and global view of the physical locations from which a service is provided.

The history module may, over any suitable time period, build up statistics relating to service provision. For example, the history module may build statistics regarding the distribution of physical locations, or may identify the main physical location from which a service is provided, for example the main server and/or the main data centre.

Thus there has been described a system configured to monitor the physical locations from which a service is provided and for building statistics on said physical locations, wherein the statistics may be used to interpret the information in respect of said physical location and to monitor, administrate, or troubleshoot the environment where the services are provided.

Figure 14A:
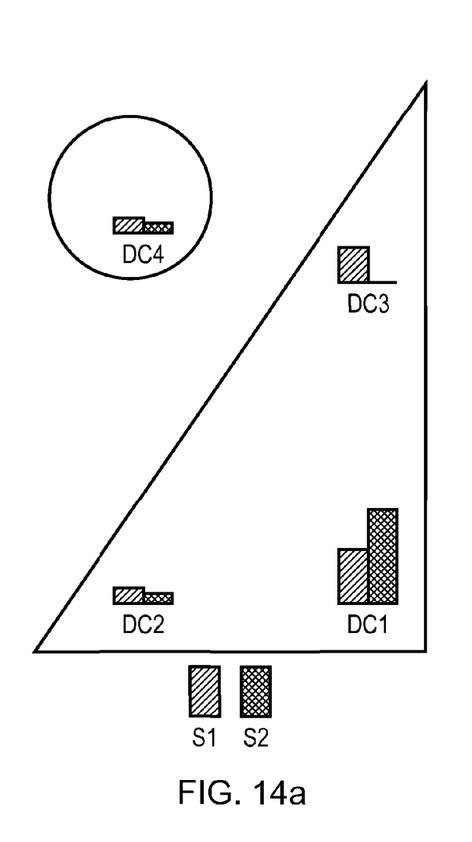
Figure 14B:
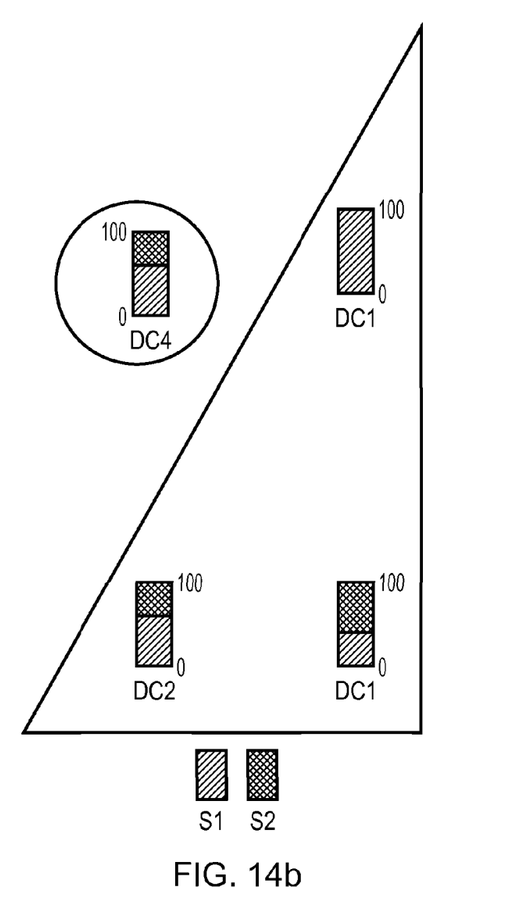
Figure 14C:
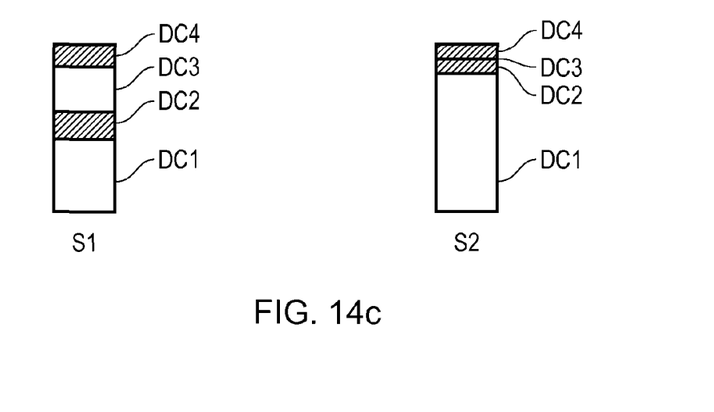

The history module can also build statistics which may be represented to the monitor's administrator and/or user automatically or on demand. Examples of such representations can be seen in FIGS. 10b, 11b and 12b. Alternative representations are illustrated in FIG. 14, where two services S1-S2 run in four data centres DC1-DC4 and wherein for each service, the number of processors running the service have been identified in the tracking record. FIG. 14a illustrates a representation wherein for each data centre the number of processors associated with each service is represented by a column. This representation enables a comparison of the absolute numbers of processors used by the two services in the data centres and an easy identification of the main data centres used by the services. FIG. 14b illustrates a representation wherein the relative service distribution of the processors within each data centre is shown. In other words, for each data centre the distribution of services running in this data centre is displayed, shown for example in percentages for a total of 100%. Even though no comparison can be made on the importance of each of the data centres or of a service across the data centres, it allows the viewer to quickly identify how important a service is for one particular data centre. For example, as can be seen in FIG. 14a, DC3 is not as important as DC1 in terms of number of processors associated with S1 and S2, however it is clear from FIG. 14b that processors in DC3 only run S1 and do not run S2. FIG. 14c shows for each service the distribution amongst the data centres of the processors associated with the service. It clearly shows that in the example considered, S1 is far more distributed amongst the data centres whereas S2 relies mostly on processors in DC1. Such a representation allows the viewer to quickly identify that there may be a risk with S2's distribution and that the number of processors associated with S2 in the other data centres may then be need to be increased.

Thus there has been described a system configured to monitor the physical locations from which a service is provided and to monitor the distribution of a service across different physical locations at different granularity and/or to monitor the number and distribution of services provided by one or more physical location.

Figure 15A:
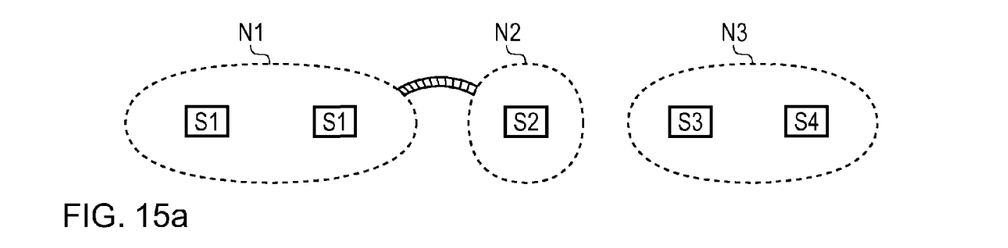
FIGS. 15a-15c show an example of a network configuration and of the invention in such a network configuration.

The monitor 15 may be one single physical entity, for example a server or a computer, or may comprise more than one physical entity. The configuration choice may depend on the services to be tracked and on the physical and network configurations. For example, FIG. 15a shows an environment wherein S1 runs in a (v)LAN N1, S2 in N2 and S3 in N3, wherein N1 and N2 are interconnected, but N3 is isolated from both N1 and N2. Assuming that, in this particular environment, the monitor 15 requires access to the (v)LANs in order to track the services, one approach may be to have a monitor with two network interfaces, one being connected to N1 and N2, the other being connected to N3.

Figure 15B:
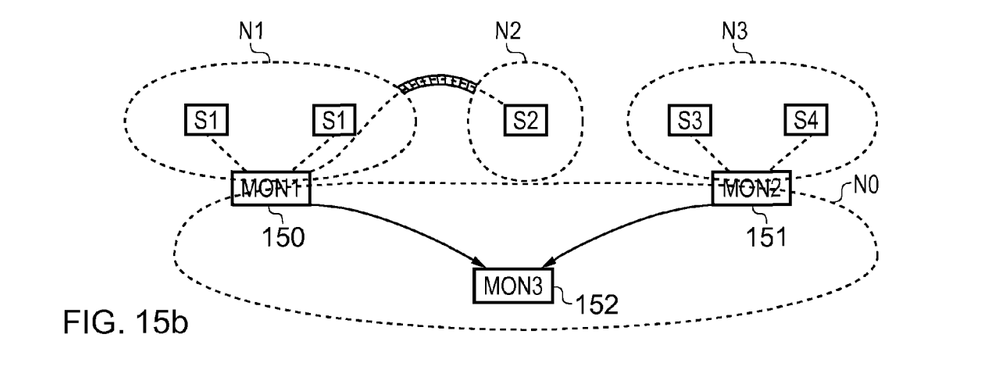

Another arrangement is represented in FIG. 15b where the monitor 15 comprises three physical entities: M$_{ON}$1, referenced to as 150, is connected to N1 and N2; M$_{ON}$2, referenced to as 151, is connected to N3; and M$_{ON}$3, referenced to as 152, is connected to M$_{ON}$1 and M$_{ON}$2, for example via a management (v)LAN N0. The management network N0 is isolated from the operational (v)LANs N1-N3 and accessed by the different monitors via a management network interface. In this example, the three physical entitles are organised in a hierarchal way and M$_{ON}$3 centralises all the tracking activity. However in other examples, the functionality distribution may be implemented differently. For example, M$_{ON}$1 and M$_{ON}$2 may only include a communication module and the query element and all other elements of the monitor 15 would than be included in M$_{ON}$3. Alternatively, M$_{ON}$1 and M$_{ON}$2 may include all functionalities and M$_{ON}$3 may then merely keep a centralised record of physical locations.

In a further approach (not represented), the centralised node, M$_{ON}$3, may also be connected to an operational (v)LAN and monitor at least one service.

Figure 15C:
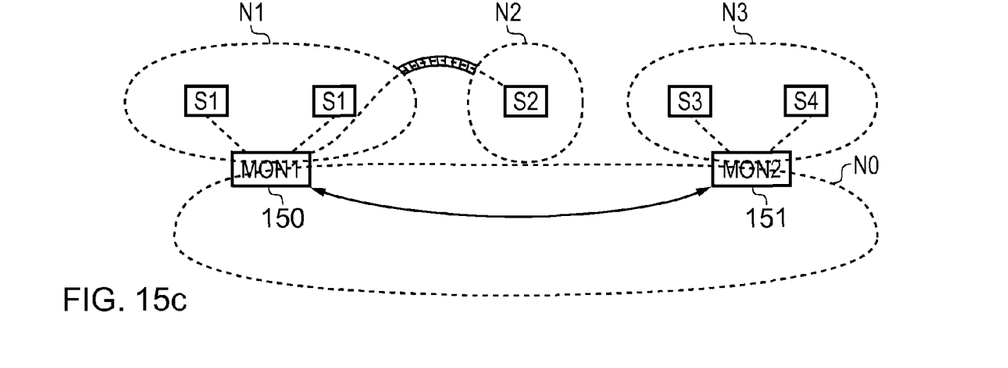

Another approach is represented in FIG. 15c where the monitor 15 comprises two physical entities M$_{ON}$1, referred to as 150, and M$_{ON}$2, referred to as 151, which are organised in a distributed configuration, which differs from the hierarchical configuration shown in FIG. 15b. In this environment, each of M$_{ON}$1 and M$_{ON}$2 implements all of the monitor's functionalities and each may keep a version of the tracking record. When M$_{ON}$1 or M$_{ON}$2 updates its tracking record, it then notifies the other monitoring node about the change so that both nodes maintain an up-to-date version of the tracking record. Alternatively, the tracking record may be maintained in one central record which both nodes can access.

Thus there has been described a flexible system configured to monitor the physical locations from which a service is provided wherein said system may be arranged in the most appropriate manner for a particular service provision environment.

The monitor may also provide the administrator and/or user with further features. For example the monitor 15 may be embodied in one server which also provides a display functionality for displaying the statistics, a web server for remote management, other monitoring functionalities or any other functionality which may or may not be related to the invention.

Figure 16A:
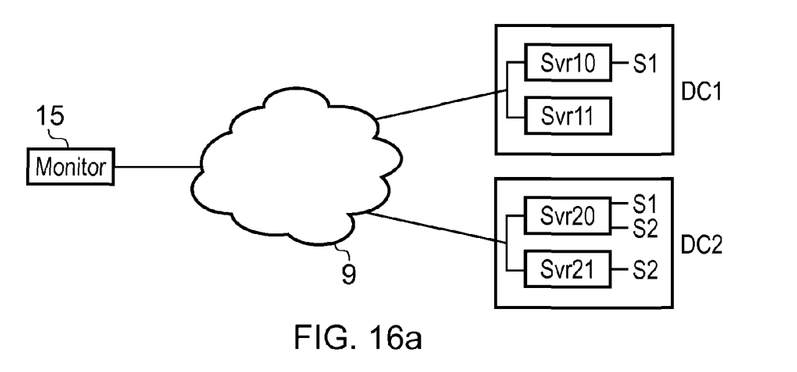
FIG. 16a is a representation of a service provision environment.
Figure 16B:
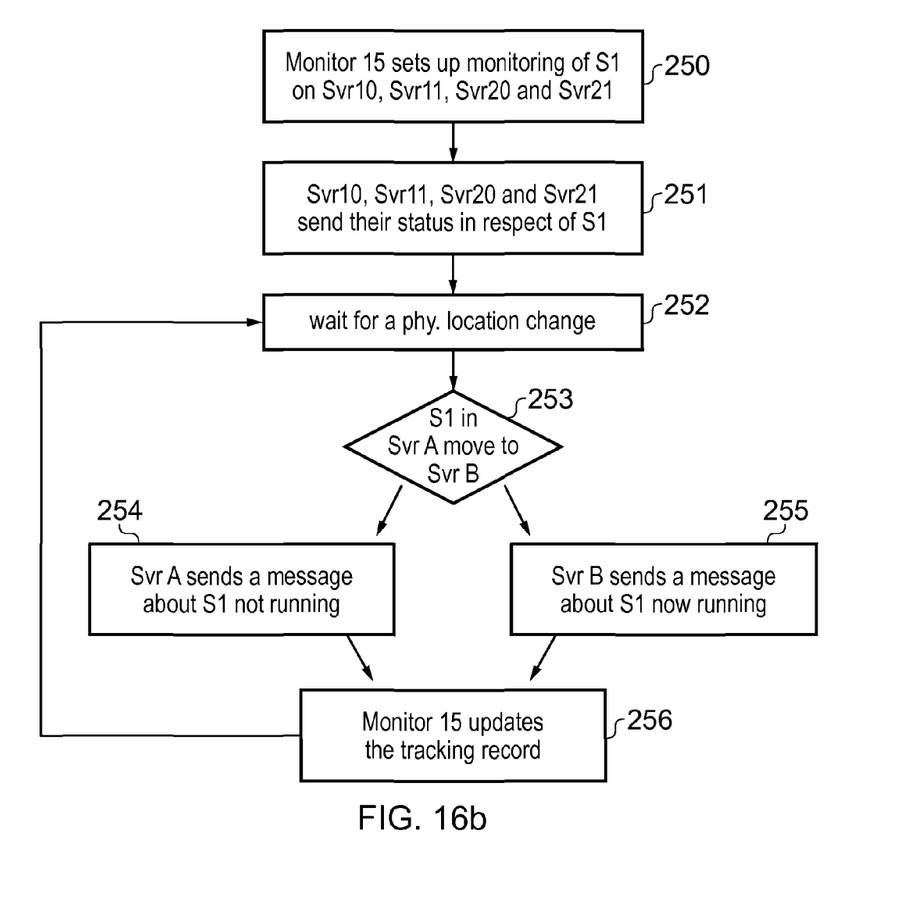
FIG. 16b is a flowchart of a status enquiry process.

FIG. 16 illustrates an example wherein the location response received by the monitor 15 may be triggered by a service changing physical location. In this embodiment, the monitor 15 is connected to the data centres DC1 and DC2 via the network 9. DC1 comprises two servers Svr10 and Svr11 and DC2 comprises Svr20 and Svr21. At a first point in time, two services are running: S1 in Svr10 and Svr20; and S2 in Svr20 and Svr21. FIG. 16a illustrates the environment at that first point in time. FIG. 16b is a flowchart starting from this first point in time where the monitor 15 starts monitoring S1 and where, at a second point in time, one instance of S1 moves from Svr10 to Svr11. At the first step 250, the monitor 15 sends a location request message to all servers Svr10-Svr21 to set up the monitoring of S1. In this particular example, only S1 is monitored therefore the location request message only regards S1. However, this message may regard more than one service. At the next optional step 251, each server sends a location response message regarding their status in respect of S1. Such status may be one of "running", "not running" or "fall-back" and may include further details in respect of D1. For example, the location response message may include how many processors are currently used by the service when it is running, or for how long the service has been in the current status.

Then, the monitor 15 waits for a physical location to change at step 252 and, at step 253, S1 moves from a first server SvrA to a second server SvrB. Even though in the present example step 253 is triggered when S1 changes server, the approach of the present example is not limited to a server change and any other appropriate physical location change may provide a trigger. The change triggers steps 254 and 255 where SvrA sends a location response message about S1 is not running anymore and SvrB sends a location response message about S2 now running. SvrA may also provide further information, for example to indicate whether S1 is now in a fall-back mode or to indicate the reason why S1 stopped running on this server (error in S1, server crashed, server overloaded, decreased demand for S1, etc.). At the next step 258, the monitor 15 updates the tracking record for S1 and goes back to step 252 waiting for another physical location change.

The location request message sent at step 250 may also include instructions for each of the server to send an update periodically so that the monitor gets at least regular location response messages and may also get occasional location response messages triggered by a change in the physical locations of the service.

In the present example, the monitor 15 sends relatively few location request messages compared to the number of location response messages it may receive. The monitor of this example may rely on an SNMP architecture, on features provided by a clustering solution, on a custom-built solution or on any other appropriate solution for providing the monitoring functionalities.

Thus the monitor of the invention enables to track the physical locations from where services are provided and may re-use information already available in enterprise systems, such as DNS or SNMP, in order to track said physical locations.

Many other variations and/or alternative implementations of the described techniques may be provided and will be envisaged by the skilled person. Such alternatives and variations are encompassed within the spirit and scope of the present invention.

What is claimed is:

1. An apparatus configured to track physical spatial locations from which a service is provided, the apparatus comprising:
   a communication module operable to send and receive messages;
   a location identifier;
   a query element operable to request the communication module to send a location request message for a service; and a
   history module;
   wherein
   the communication module is operable to:
      receive a location response message responsive to said location request message, said location response message comprising location information for the service; and
      forward the location information of the service to the location identifier;
   the location identifier is operable to identify the physical spatial location associated with the location information of the service and to forward the data describing the physical spatial location to the history module; and
   the history module is operable to use the data describing the identified physical spatial location and a timestamp indicating the time at which the service is provided at the identified physical spatial location to create or to update a historical tracking record of physical spatial locations for the service for producing a service provision location history.

2. The apparatus of claim 1, wherein the history module is further operable to build tracking statistics of physical spatial locations of the service over two or more periods of time.

3. The apparatus of claim 2, wherein the tracking statistics include one or more selected from the group comprising: a statistical distribution of the service across the physical spatial locations identified in the data forwarded by the location identifier over the two or more periods of time; and a main physical spatial location of the service over the two or more periods of time.

4. The apparatus of claim 2, wherein part or all of the tracking statistics are built from data relating to one or more selected from the group comprising: consecutive periods of time and rolling periods of time.

5. The apparatus of claim 1, wherein the history module further comprises data storage and retrieval mechanism, to keep tracking records of physical spatial location information for services.

6. The apparatus of claim 2, wherein the history module is further operable to build tracking statistics according to one or more selected from the group comprising: on request, and automatically.

7. The apparatus of claim 1, wherein the identified physical spatial location comprises one or more elements, each element being selected from the group consisting of a processor core, a server, a cabinet, a room, a data centre, a building, a postcode, a building, a city and a geographical region.

8. The apparatus of claim 1, wherein the communication module is operable to send and receive IP messages.

9. The apparatus of claim 1, wherein the location request message comprises one or more selected from the group comprising: at least one DNS request: and at least part of an SNMP message.

10. The apparatus of claim 1, wherein the location information comprises an IP address.

11. The apparatus of claim 1, wherein the location identifier retrieves the physical spatial location information from at least one database providing associations between logical and physical spatial locations.

12. A method for tracking physical spatial locations from which a service is provided, the method comprising:
sending from a communication module a location request message for a selected service to a computer network;
receiving from the computer network, at the communication module, a location response message responsive to said location request message, said location response message comprising location information for the selected service;
identifying the physical spatial location associated with the location information;
using the identified physical spatial location and a timestamp indicating the time at which the service is provided at the identified physical spatial location to create or to update a historical tracking record of physical spatial locations for the selected service for producing a service provision location history.

13. The method of claim 12, further comprising:
building tracking statistics of physical spatial location information of the selected service over two or more periods of time.

14. The method of claim 13, wherein the building tracking statistics of physical spatial location information of the selected service is performed according to one or more selected from the group comprising; on request and automatically.

15. The method of claim 12, wherein creating a tracking record of physical spatial locations further comprises using a database to keep tracking records of physical spatial location information for services.

16. The method of claim 12, wherein the location response message comprises an IP message.

17. The method of claim 12, wherein the location request message comprises one or more selected from the group comprising; at least one DNS request; and at least part of an SNMP message.

18. The method of claim 12, wherein the location information comprises an IP address.

19. The method of claim 12, wherein identifying the physical spatial location associated with the location information further comprises retrieving the physical spatial location information from at least one database providing associations between logical and physical spatial locations.

* * * * *